(12) United States Patent
Gaither et al.

(10) Patent No.: US 8,924,653 B2
(45) Date of Patent: Dec. 30, 2014

(54) TRANSACTIONAL CACHE MEMORY SYSTEM

(75) Inventors: Blaine D. Gaither, Ft. Collins, CO (US); Judson E. Veazey, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 941 days.

(21) Appl. No.: 11/554,672

(22) Filed: Oct. 31, 2006

(65) Prior Publication Data

US 2008/0104332 A1 May 1, 2008

(51) Int. Cl.
*G06F 12/00* (2006.01)
*G06F 12/08* (2006.01)

(52) U.S. Cl.
CPC ........ *G06F 12/0815* (2013.01); *G06F 12/0822* (2013.01)
USPC ........... 711/144; 711/118; 711/119; 711/128; 711/141; 711/145; 711/146; 711/147; 711/148

(58) Field of Classification Search
USPC ................. 711/118–119, 128, 141, 144–146, 711/147–148
See application file for complete search history.

(56) References Cited

U.S. PATENT DOCUMENTS

| | | | |
|---|---|---|---|
| 5,428,761 A | 6/1995 | Herlihy et al. | |
| 6,360,231 B1 | 3/2002 | Pong et al. | |
| 6,374,333 B1 * | 4/2002 | Arimilli et al. | 711/145 |
| 6,477,622 B1 * | 11/2002 | Normoyle et al. | 711/143 |
| 6,622,214 B1 * | 9/2003 | Vogt et al. | 711/141 |
| 6,658,536 B1 * | 12/2003 | Arimilli et al. | 711/141 |
| 6,775,748 B2 * | 8/2004 | Jamil et al. | 711/145 |
| 6,880,045 B2 | 4/2005 | Pong et al. | |
| 6,993,632 B2 * | 1/2006 | Kruckemyer et al. | 711/145 |
| 2002/0073071 A1 | 6/2002 | Pong et al. | |
| 2004/0128450 A1 * | 7/2004 | Edirisooriya et al. | 711/141 |
| 2004/0128451 A1 * | 7/2004 | Edirisooriya et al. | 711/143 |
| 2005/0060559 A1 | 3/2005 | McKenney | |
| 2005/0086446 A1 | 4/2005 | McKenney et al. | |
| 2006/0085588 A1 | 4/2006 | Rajwar et al. | |
| 2006/0085591 A1 * | 4/2006 | Kumar et al. | 711/113 |

* cited by examiner

*Primary Examiner* — Sanjiv Shah
*Assistant Examiner* — Zhuo Li
(74) *Attorney, Agent, or Firm* — Setter Roche LLP; Kyle J. Way (57) ABSTRACT

A method for providing a transactional memory is described. A cache coherency protocol is enforced upon a cache memory including cache lines, wherein each line is in one of a modified state, an owned state, an exclusive state, a shared state, and an invalid state. Upon initiation of a transaction accessing at least one of the cache lines, each of the lines is ensured to be either shared or invalid. During the transaction, in response to an external request for any cache line in the modified, owned, or exclusive state, each line in the modified or owned state is invalidated without writing the line to a main memory. Also, each exclusive line is demoted to either the shared or invalid state, and the transaction is aborted.

21 Claims, 5 Drawing Sheets

TRANSACTIONAL CACHE MEMORY SYSTEM

BACKGROUND

The use of multiple processors executing operations in parallel within a computer system has long been recognized as a means for increasing computational performance and throughput of the system. However, to generate correct and repeatable results in such a system, communication between the various processors must occur in a controlled manner. To facilitate this communication, the processors often access the same data memory locations within a shared memory space to transfer messages or other data therebetween, as well as to access and possibly modify other data shared between processors. In one example, each of the processors may require "atomic" read-modify-write access to one or more of these memory locations to avoid corrupting or compromising the data within these locations. In other words, each of the processors may need to perform multiple operations on a particular datum without allowing access to these same locations by another processor.

In some computer systems, hardware-intensive constructs called "locks," such as binary semaphores, counting locks and spinlocks, have been employed to provide controlled access to data shared between processors. Generally, a processor that successfully accesses a lock or similar construct has uninterruptible access to one or more memory locations protected by the lock until the processor decides to release the lock. While locks are effective at controlling access to data shared between processors, locks essentially implement a blocking scheme, meaning that other processors requiring access to the same data are temporarily halted while another processor possesses the lock, thus negatively impacting system performance. The amount of blocking is also affected by the degree of granularity of the shared data being protected by one or more locks. For example, under high granularity, in which each lock protects a relatively small amount of data, the amount of overhead associated with the locks is increased, but the amount of contention for any single lock is reduced. Oppositely, low granularity, in which each lock protects more data, results in fewer locks being implemented, but also causes more contention for each lock. This blocking or contention is exacerbated if the processor with the lock fails. Other well-known maladies associated with locks, such as deadlock, livelock, and priority inversion, are also problematic. Further, use of the locks often significantly increases unnecessary overhead, as the odds of two or more processors accessing the same shared memory location at any one time are relatively low in most computer systems.

To address these problems, the concept of transactional memory was developed. Instead of employing a hardware blocking scheme, transactional memory utilizes a more optimistic, software-oriented approach. Generally, a processor tentatively executes a series of operations, termed a "transaction," on one or more memory locations without regard to the actions of other processors, so no blocking occurs at that point. Concurrently, the processor records the operations in a log. After the necessary operations, the processor then "validates," or verifies that other processors have not accessed the same shared data. If not, all changes made to the data are "committed," or made permanent. Otherwise, a conflict may have occurred, thus requiring the processor to reverse all of the associated memory changes and abort the transaction. In that case, the processor is typically free to reattempt the transaction immediately.

While software-based transactional memory is believed to be an effective and efficient alternative to current hardware-based blocking schemes, a significant amount of software overhead is normally incurred, thus detracting from some of the benefits that transactional memory provides.

DETAILED DESCRIPTION

Figure 1:
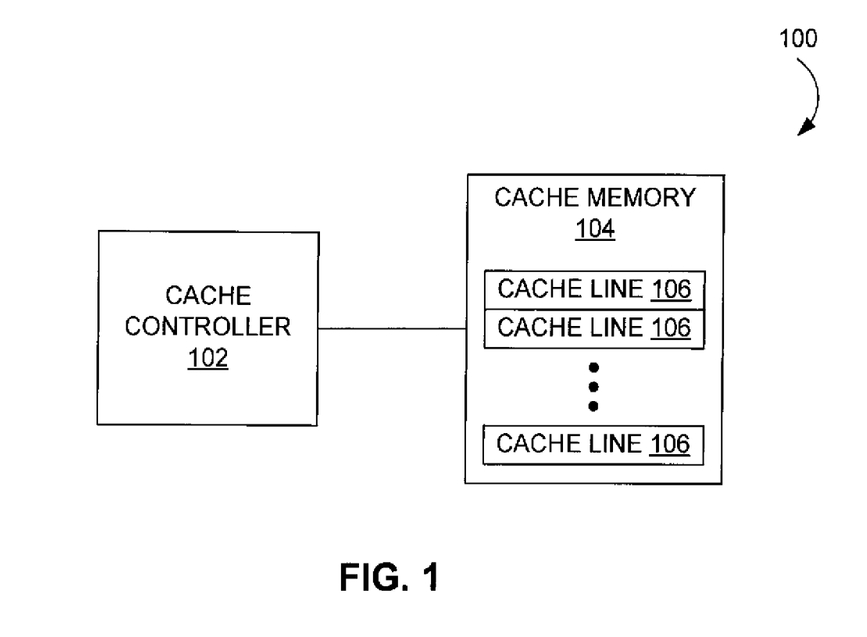
FIG. 1 is a block diagram of a cache memory system for providing transactional memory according to an embodiment of the invention.

FIG. 1 illustrates one embodiment of the invention: a cache memory system 100 including a cache memory 104 and an associated cache controller 102. The cache memory 104 includes a number of cache lines 106, each of which may hold a copy of data residing in some portion of a main memory (not shown). Typically, the cache memory 104 is a smaller and faster memory than the main memory, allowing a processor coupled with the cache memory 104 to access data more quickly and efficiently. In one embodiment, each cache line 106 possesses the capacity to hold several addressable memory locations of the main memory. The cache controller 102 is configured to control the cache memory 104 to employ one or more of the cache lines 106 as a transactional memory, as will be described in greater detail below.

The cache memory system 100 may be utilized within any number of computer system architectures. For example, each of several processors may include a cache memory 104 and associated cache controller 102, wherein each of the processors is coupled through its cache memory 104 to a main memory. In another implementation, a symmetric multiprocessor (SMP) system may include several processors, each of which includes a cache memory 104, a cache controller 102 and a primary memory. Each primary memory constitutes a portion of a main memory accessible by any of the processors in the SMP system. Many other multiple processor systems, wherein each processor incorporates a cache memory, may also benefit from application of the cache memory systems and methods described in greater detail below.

The cache controller 102 enforces a cache coherency protocol upon the cache memory 104. According to the cache coherency protocol, each cache line 106 resides in a particular "state" that may change over time depending on accesses to the data within the associated cache line 106. In one embodiment, the cache coherency protocol is a Modified-Owned-Exclusive-Shared-Invalid (MOESI) protocol, named for the various states each of the cache lines 106 may attain.

Figure 2:
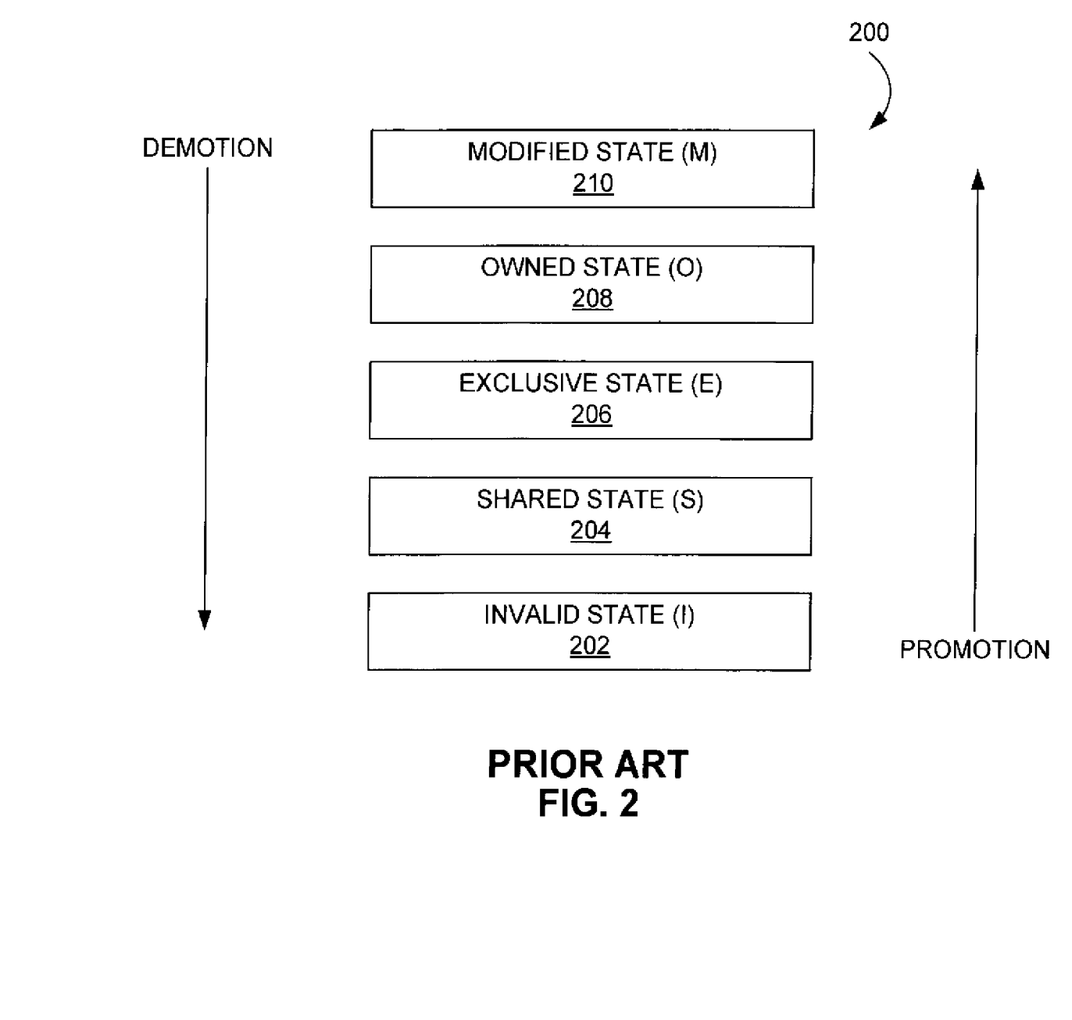
FIG. 2 depicts possible states of a cache line in a typical cache memory in the prior art.

The state set 200 of a MOESI cache coherency protocol from the prior art is shown graphically in FIG. 2. The various states (i.e., the invalid state 202, the shared state 204, the exclusive state 206, the owned state 208, and the modified state 210) are arranged in a hierarchical order indicative of the contents of the cache line. Transitioning a cache line 106 from a lower state to a higher state is termed "promotion," while transferring a cache line 106 from a higher state to a lower one is "demotion."

The lowest state is the invalid state 202. A cache line 106 is invalid if the line 106 does not contain any valid data from its associated main memory. As a result, this cache line 106 is available for storing data to be read in from the main memory, typically as a result of a request for read access to the data from the processor coupled with the cache memory 104.

A cache line 106 resides in the shared state 204 if the line 106 possesses a valid (i.e., the most recent) copy of the data stored in related memory locations of the main memory. In the shared state 204, other cache memories 104 associated with other processors may also hold the most recent copy of the same data.

If a cache line 106 contains data found only in the current cache memory 104, and not in any other cache memory 104 of the system, and that data matches the corresponding data value in main memory, the cache line 106 may reside in the exclusive state 206.

In the owned state 208, a cache line 106 contains the most recent copy of the associated data from the main memory. Other cache memories 104 within the system may also contain the same updated copy. However, unlike with the shared state 204, the data in an owned cache line 106 may not match the data in the corresponding memory locations of the main memory. In other words, the associated data value held in the main memory is old, or "stale." Typically, only one cache memory 104 holds the data in the owned state 208; all remaining cache memories 104 holding the same copy of the data maintain their associated cache lines 106 in the shared state 204.

At the top of the cache coherency protocol state set 200 is the modified state 210. A cache line 106 in the modified state 210 holds the most recent copy of the associated data, and the corresponding memory locations in the main memory are stale. Also, no other cache memories 104 in the system hold a copy of the data in any of their cache lines 106.

Various reading and writing operations on a cache line 106, which are normally instigated by the processor coupled with the cache memory 104, often alter the particular state of the cache line 106 according to the cache coherency protocol. The protocol allows the various cache memories 104 to enhance parallel access by the system processors to the data in the main memory while preventing the processors from using different values for the same data. This enforcement of data values within the different cache memories 104 occurs in part by way of the cache line states 200 described above, none of which allow a copy of data in one cache memory 104 to disagree with the same data stored in another cache memory 104. As described later, this quality is exploited to employ at least some of the cache lines 106 as transactional memory.

The following discussion provides a few details regarding how the operation of the cache memory 104 and associated controller 102, as well as how the state of each cache line 106 may be promoted or demoted during operation, assuming use of a typical MOESI cache coherency protocol. Some of these details may vary from embodiment to embodiment.

Generally, based on these particular MOESI states 200, a cache memory 104 may satisfy a read request from its corresponding processor as long as the target data resides in the cache memory 104; in other words, the particular cache line 106 holding the data may be in any state except the invalid state 202. However, a write from the processor to its cache memory 104 may only occur if the target data is present in one of the cache lines 106 in the modified state 210, the owned state 208, or the exclusive state 206. Further, a cache memory system 100 with a cache line 106 in the owned state 208 typically informs other caches 104 of the write operation so that their copy of the data may be updated or invalidated as well.

If the cache memory 104 cannot satisfy a read request from its processor, the cache controller 102 causes a read from the main memory of the requested data, and stores that data into a cache line 106, as shown in FIG. 1. Typically, the data is read into an invalid cache line 106, if available. Otherwise, a valid cache line 106 first may be "evicted," or removed from the cache memory 104, to provide room for the new data. In that case, the affected cache line is returned (at least temporarily) to the invalid state 202. Generally, cache lines 106 in the shared state 204 and the exclusive state 206 may be evicted at any time, while cache lines 106 in the owned state 208 and the modified state 210 are written back into the main memory, which holds an out-of-date copy of that data.

In one implementation, such a read from the main memory into the cache memory 104 may be performed under either a "shared mode" or an "exclusive mode". Under the shared mode, the cache line 106 receiving the new data often enters the shared state 204. The shared mode may be used if the processor associated with the cache memory 104 has no short-term need to alter the data, or if a copy of the line is already stored in another cache. If, instead, the processor plans to write a new value for the cached data, the data may be read from the main memory under the exclusive mode, thus allowing the cache line 106 receiving the data to attain the exclusive state 206. Under exclusive mode, the cache controller 102 associated with each of the remaining cache memories 104 generally is made aware of the exclusive mode being instigated by the requesting cache controller 102.

This circumstance of one cache controller 102 being informed of the operations of another occurs in one example by way of "snooping," or monitoring bus activity initiated by the other cache controllers 102. In other cases, a cache controller 102 takes the initiative to inform the other controllers 102 of its activities, or to request an action by other controllers 102, by way of "broadcast" messages. In some embodiments, a mixture of snoop requests and broadcast messages is employed, as some situations are best addressed by one or the other, depending on the particular operation to be performed. In another example, a cache coherency directory stored in main memory or another memory generally accessible by each cache controller 102 may hold all of the information necessary to maintain cache coherency.

For example, the cache controller 102 may snoop read accesses to determine if another cache controller 102 is attempting to read data from the main memory that resides in a modified cache line 106 of its associated cache memory 104. If so, the cache controller 102 often has the responsibility to hold off that particular read operation so that the cache controller 102 can write the data in the modified cache line 106 back to the main memory. Under that scenario, the cache line 106 is demoted to the shared state 204 or the invalid state 202.

In another example, a cache controller 102 may require writing to a cache line 106 it currently holds in the shared state 204. To do so, the cache controller 102 must promote the line 106 to the exclusive state 206 or the owned state 208. Prior to promotion to the exclusive state 206, the cache controller 102 may issue an "invalidate" broadcast to other cache controllers 102 so that they may demote their corresponding cache line 106 to the invalid state 202.

Under another scenario, the cache controller 102 holding one or more cache lines 106 in the exclusive state 206 may snoop read operations from the other controllers 102 to the main memory. If one of these read operations involves one of the exclusive cache lines 106, the controller 102 typically demotes that cache line 106 to the shared state 204. Other examples of operations within a cache memory 104 and its controller 102 causing state changes of cache lines 106 within the cache memory 104 and other cache memories 104 exist.

While the preceding discussion focuses primarily on a MOESI cache, other cache coherency protocols that utilize a subset of the states 200 shown in FIG. 2 are often used. For example, a Modified-Shared-Invalid (MSI) protocol, a Modified-Exclusive-Shared-Invalid (MESI) protocol, or a Modified-Owned-Shared-Invalid (MOSI) protocol may be incorporated in other embodiments of the invention, resulting in a simpler design for the cache controller 102, but at the possible expense of less efficient operation compared to the MOESI protocol. For example, the owned state 208 of the MOESI protocol allows a cache controller 102 to delay writing back any modifications it makes to that cache line 106 while allowing other cache memories 104 to share that data. Similarly, the exclusive state 206 of the MOESI and MESI protocols allows a cache controller 102 to modify an exclusive cache line 106 without first invalidating other copies of that data held in other cache memories 104.

Figure 3:
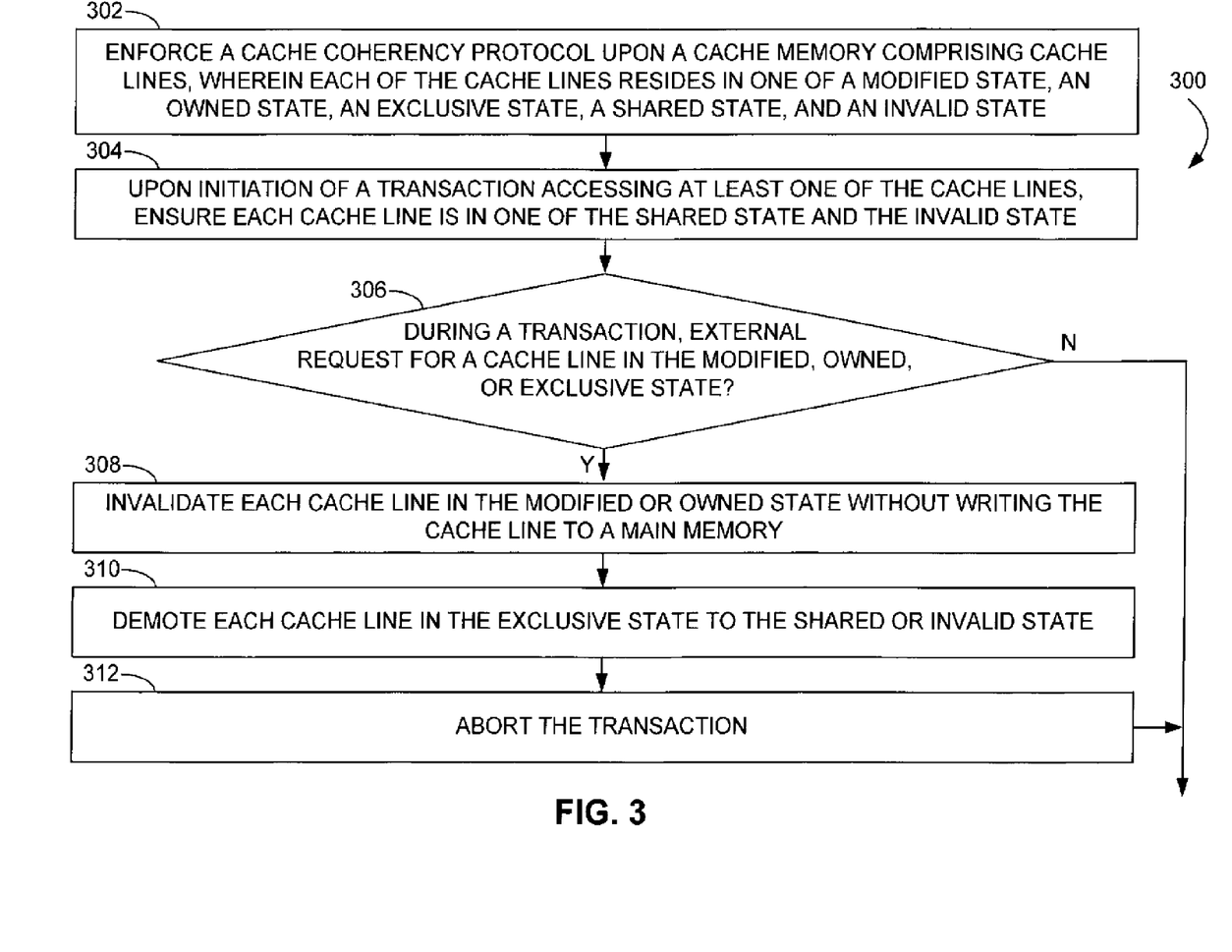
FIG. 3 is a flow diagram of a method of providing transactional memory according to an embodiment of the invention.

Any of these cache coherency protocols may be employed in various embodiments of the invention, such as a method 300 of providing a transactional memory, which is depicted in the flow diagram of FIG. 3. The method 300 is described herein in relation to the cache memory system 100 of FIG. 1, although other cache memory system configurations may be used in other embodiments. In the method 300, the cache controller 102 enforces a cache coherency protocol upon the cache memory 104 comprising cache lines 106, where each of the cache lines 106 resides in one of the states 200 of FIG. 2 (i.e., the invalid state 202, the shared state 204, the exclusive state 206, the owned state 208, or the modified state 210) (operation 302). Thus, any one of the protocols (i.e., MOESI, MESI, MOSI, or MSI) described above, or possibly others employing these states, may be enforced.

When the processor associated with the cache memory 104 initiates a transaction involving at least one of the cache lines 106, the cache controller 102 ensures that each of the cache lines 106 is in either the shared state 204 or the invalid state 202 (operation 304). Thus, in one embodiment, the cache controller 102 demotes any of the cache lines 106 in the modified state 210, the owned state 208, or the exclusive state 206. In the case of the modified state 210 or the owned state 208, the cache controller 102 may purge or write back the data in the cache lines 106 to update the corresponding locations in the main memory.

During the transaction, an external request (i.e., a request not originated by the transaction) for any of the cache lines 106 in the modified state 210, the owned state 208, or the exclusive state 206 (operation 306) may occur, thus requiring demotion of the affected cache line 106. For example, another processor not directly coupled with the cache memory 104 may attempt to read data from the main memory that is cached in one of the cache lines 106 in one of these modes. Thus, the cache controller 102 may detect the read attempt by way of a snoop request. In another example, the external request may be a capacity fault due to exhaustion of free space in the cache memory 104, thus requiring eviction of one of the cache lines 106. As a result, the cache controller 102 invalidates (i.e., demotes to the invalid state 202) each of the cache lines 106 in the modified state 210 or the owned state 208 without writing the cache line 106 to the main memory (operation 308). Further, the cache controller 102 demotes each first cache line 106 in the exclusive state 206 to either the shared state 204 or the invalid state 202 (operation 310). Finally, the transaction is aborted (operation 312). If the transaction completes successfully without an abortion, the cache controller 102 continues to operate the cache memory according to the normal cache coherency protocol rules.

Thus, under various potential embodiments of the method 300, the cache controller 102 uses the cache memory 104 in conjunction with the cache coherency policy essentially to delay writing back any changes to data in the cache lines 106 during the transaction at least until the transaction is complete.

In one embodiment, software executed by the processor maintains a single transactional state for the entire cache memory 104. In that case, by setting the transactional state, the processor indicates to the cache controller 102 the initiation of a transaction. Similarly, if the cache controller 102 has not aborted the transaction by the time the processor has completed the transaction, the processor clears the transactional state to indicate to the controller 102 of that fact. If, instead, the cache controller 102 must abort the transaction, the controller 102 may issue an interrupt or a trap to the processor to announce the abortion of the transaction. In another implementation, a predication bit of one or more processor instructions may be set to indicate whether the instructions are to be executed. In this embodiment, the processor associated with the cache memory 104 executes only one transaction at a time. In another implementation, more than one transaction may be in process at a time if the transactions are entirely independent such that execution of one transaction has no effect on the data being processed by the other.

Figure 4:
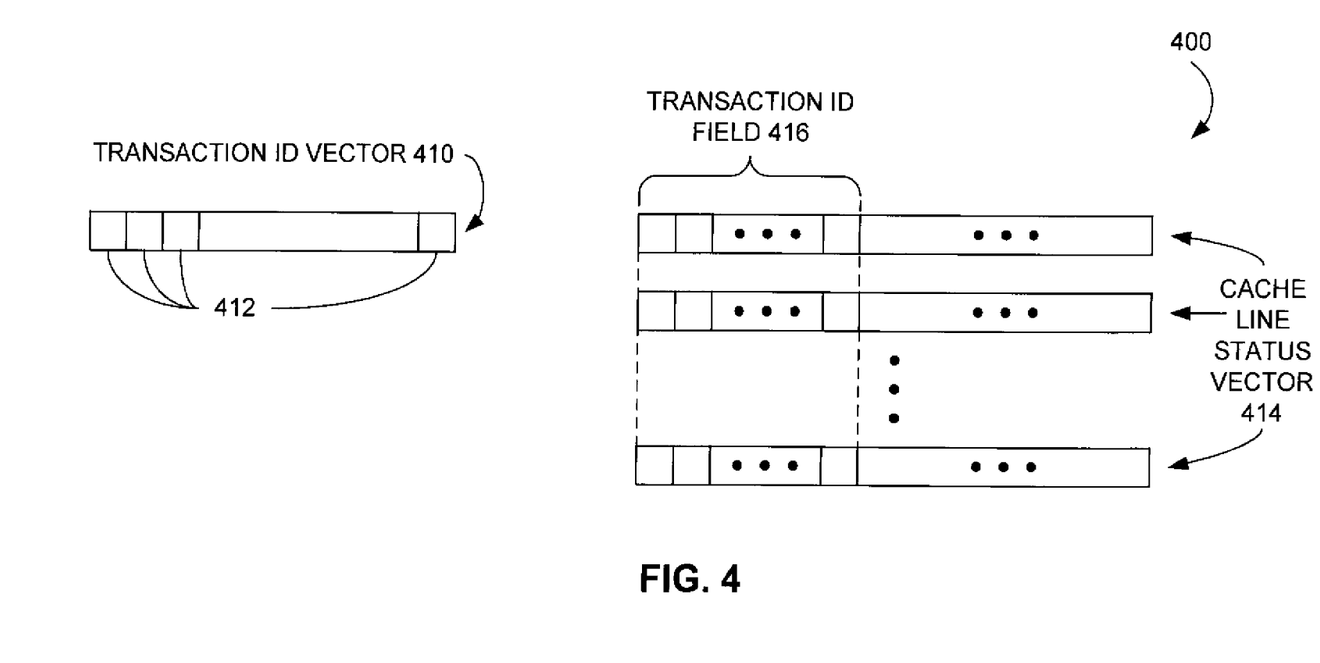
FIG. 4 is a block diagram of data structures employable in a method of providing transactional memory according to another embodiment of the invention.

In another embodiment, the processor may process multiple transactions concurrently while enforcing data independence between the transactions. FIG. 4 provides a block diagram illustrating a set 400 of data structures employable in one embodiment to track transactions on a cache-line-by-cache-line basis. More specifically, the data structures 400 include a transaction identifier (ID) vector 410 associated with the cache memory 104 in general. In the particular embodiment of FIG. 4, each bit 412 of the vector 410 represents a particular transaction ID. Thus, a particular transaction ID bit 412 being set indicates that the identified transaction is currently active. Thus, the number of transactions possibly active at any one time is equal to the number of bits 412 in the transaction ID vector 410.

The data structures 400 also include a transaction ID field 416 residing within with a cache line status vector 414 associated with each cache line 106 of the cache memory 104. The cache line status vector 414 may include other status information for its corresponding cache line 106, such as the current cache coherency state 200 of the cache line, and a cache tag for the line 106 indicating which data from the main memory is stored in the line 106. In the specific embodiment of FIG. 4, the transaction ID field 416 provides a binary-encoded value of the transaction ID with which the cache line 106 is associated. Thus, each cache line 106 is associated with at most one transaction at a time. If the transaction ID field 416 is zero, the cache line 106 is not associated with any transaction.

Figure 5:
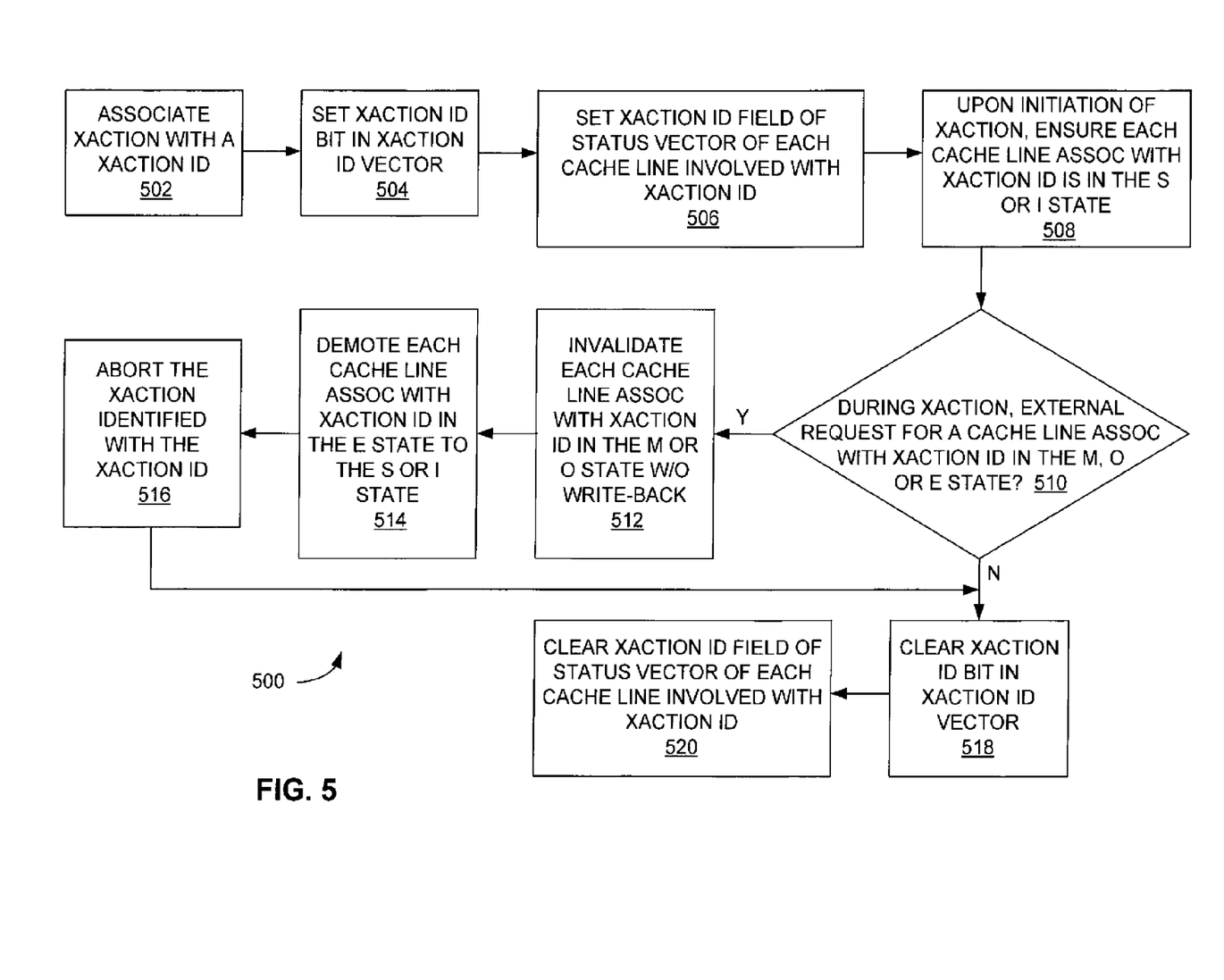
FIG. 5 is a flow diagram of a method of providing transactional memory employing the data structures of FIG. 4 according to another embodiment of the invention.

FIG. 5 illustrates a method 500 for providing transactional memory, presuming the use of the data structures 400 of FIG. 4 within the cache memory system of FIG. 1. In one embodiment, a transaction begins with associating the transaction with a transaction ID (operation 502) and setting the corresponding transaction ID bit 412 in the transaction ID vector 410 (operation 504). Each of the cache lines 106 to be involved in the transaction are marked with the transaction ID in the transaction ID field 416 of the corresponding cache line status vectors 414 (operation 506).

Each transaction is then processed as described above, wherein only the cache lines 106 associated with the transaction ID are involved. For example, upon initiation of the transaction, each of the cache lines 106 associated with the transaction ID are ensured to be in either the invalid state 202 or the shared state 204 (operation 508); the state 200 of the other cache lines 106 in the cache memory 104 need not be modified.

During the transaction, an external request for any of the cache lines 106 with the same transaction ID in the modified state 210, the owned state 208 or the exclusive state 206 (operation 510) may occur, thus requiring demotion of the requested cache line 106. In response, the cache controller 102 may invalidate (i.e., demote to the invalid state 202) each of the cache lines 106 with that transaction ID in the modified state 210 or the owned state 208 without writing back the contents of these cache lines 106 to the main memory (operation 512). As before, another processor not directly coupled with the cache memory 104 may attempt to read data from the main memory that is cached in one of the cache lines 106 in one of these modes. In other words, the cache controller 102 may detect or snoop the read attempt by the other processor. Further, a different transaction performed on the same processor may also make the external request detected by the cache controller 102. Alternatively, the external request may be a capacity fault, as described above. Also in response to the external request, the cache controller 102 may demote each of these cache lines 106 in the exclusive state 206 to the shared state 204 or the invalid state 202 (operation 514). The cache controller 102 then aborts the transaction identified with the transaction ID (operation 516). To this end, the cache controller 102 may issue an interrupt, along with the transaction ID of the transaction being aborted, to the processor. Traps or predication bits may be employed to similar end in other embodiments. Otherwise, if the transaction completes successfully, the cache controller 102 continues to operate the cache memory 104 under the normal cache coherency protocol rules.

Whether the transaction terminates successfully or is aborted, the associated transaction ID bit 412 of the transaction ID vector 410 is cleared (operation 518). Accordingly, the cache controller 102 clears the transaction ID field 416 of the cache line status vector, 414 for each cache line 106 associated with that particular transaction ID (operation 520).

As described above, various embodiments of the present invention utilize controller logic associated with a cache memory to provide transactional memory, which in the past has been implemented almost exclusively in software. Thus, application of one or more of these embodiments may reduce significantly the development time and costs associated with a pure software transactional memory while providing a more efficient solution by reducing the overhead normally associated with transactional memory.

While several embodiments of the invention have been discussed herein, other embodiments encompassed by the scope of the invention are possible. For example, while some embodiments of the invention are described above in reference to an SMP computing system architecture, other systems employing multiple processing systems and caching systems may benefit from other embodiments of the invention. Further, other embodiments may be applied to a single processor coupled with a single caching system that executes multiple processes or threads and, hence, multiple transactions. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for providing transactional memory, comprising:
    enforcing a cache coherency protocol upon a cache memory including first cache lines, wherein each first cache line is in one of a modified state, an owned state, an exclusive state, a shared state, and an invalid state;
    upon initiation of a first transaction accessing at least one of the first cache lines, ensuring each first cache line is in one of the shared state and the invalid state, the ensuring including writing back to main memory each cache line in the modified state and each cache line in the owned state; and
    during the first transaction, in response to a first external request for any first cache line in the modified state, the owned state, or the exclusive state:
        invalidating each first cache line in the modified state and each cache line in the owned state without writing the first cache line to a main memory;
        demoting each first cache line in the exclusive state to one of the shared state and the invalid state;
        aborting the first transaction; and
    reattempting the first transaction after the aborting.

2. The method of claim 1, wherein ensuring each of the first cache lines is in one of the shared state and the invalid state includes demoting each first cache line in the exclusive state to one of the shared state and the invalid state.

3. The method of claim 1, wherein the first external request includes one of:
    a request to read from main memory data that is cached in any first cache line,
    a snoop request attempting to read from the first cache line, the snoop request originating outside the first transaction, and
    a capacity fault.

4. The method of claim 1, further comprising:
    receiving an indication of the initiation or a completion of the first transaction by way of a software transactional state for the cache memory, said first transaction being a read-modify-write transaction;
    indicating an abortion of the read-modify-write transaction.

5. The method of claim 4, wherein indicating the abortion of the first transaction includes at least one of issuing an interrupt, issuing a trap, and setting a predication bit.

6. The method of claim 1, further comprising:
    receiving an indication of execution of the first transaction by way of a first transaction identifier associated with the first cache lines;
    indicating an abortion of the first transaction;
    receiving an indication of execution of a second transaction accessing at least one of second cache lines of the cache memory by way of a second transaction identifier associated with the second cache lines; and
    indicating an abortion of the second transaction.

7. The method of claim 6, wherein:
    receiving the indication of execution of the first transaction includes detecting a first bit of a transaction identifier vector being set, and detecting a transaction identifier field of a cache line status vector for each of the first cache lines being set with the first transaction identifier; and receiving the indication of execution of the second transaction includes detecting a second bit of the transaction identifier vector being set, and detecting the transaction identifier field of the cache line status vector for each of the second cache lines being set with the second transaction identifier.

8. The method of claim 6, wherein:
indicating the abortion of the first transaction includes at least one of issuing a first interrupt, issuing a first trap, and setting a first predication bit; and
indicating the abortion of the second transaction includes at least one of issuing a second interrupt, issuing a second trap, and setting a second predication bit.

9. The method of claim 6, further comprising:
upon initiation of the second transaction, ensuring each of the second cache lines is in one of the shared state and the invalid state; and
during the second transaction, in response to a second external request for any of the second cache lines in the modified state, the owned state, or the exclusive state:
invalidating each of the second cache lines in the modified state or the owned state without writing the cache line to the main memory;
demoting each of the second cache lines in the exclusive state to one of the shared state and the invalid state; and
aborting the second transaction.

10. The method of claim 9, wherein the second external request includes one of a snoop request originating outside the second transaction and a capacity fault.

11. A cache memory system for providing transactional memory, comprising:
a cache memory including first cache lines; and
a cache controller to:
enforce a cache coherency protocol upon the cache memory, wherein each first cache line is in one of a modified state, an owned state, an exclusive state, a shared state, and an invalid state;
upon initiation of a first transaction accessing at least one of the first cache lines, ensure each first cache line is in one of the shared state and the invalid state, the ensuring including writing back to main memory each cache line in the modified state and each cache line in the owned state; and
during the first transaction, in response to a first external request any first cache line in the modified state, the owned state, or the exclusive state:
invalidate each first cache line in the modified state and each first cache line in the owned state without writing the first cache line to a main memory;
demote each first cache line in the exclusive state to one of the shared state and the invalid state;
abort the first transaction; and
reattempt the first transaction after aborting the first transaction.

12. The cache memory system of claim 11, wherein to ensure each of the first cache lines is in one of the shared state and the invalid state, the cache controller is to demote each first cache line in the exclusive state to one of the shared state and the invalid state.

13. The cache memory system of claim 11, wherein the first external request includes one of:
a request to read from main memory data that is cached in any first cache line;
a snoop request attempting to read from the first cache line, the snoop request, the snoop request originating outside the first transaction; and
a capacity fault.

14. The cache memory system of claim 11, wherein the cache controller is further to:
receive an indication of the initiation or a completion of the first transaction by way of a software transactional state for the cache memory, wherein said first transaction is a read-modify-write transaction; and
indicate an abortion of the read-modify-write transaction.

15. The cache memory system of claim 14, wherein the cache controller is further to indicate the abortion of the first transaction by way of at least one of issuing an interrupt, issuing a trap, and setting a predication bit.

16. The cache memory system of claim 11, wherein the cache controller is further to:
receive an indication of execution of the first transaction by way of a first transaction identifier associated with the first cache lines;
indicate an abortion of the first transaction;
receive an indication of execution of a second transaction accessing at least one of second cache lines of the cache memory by way of a second transaction identifier associated with the second cache lines; and
indicate an abortion of the second transaction.

17. The cache memory system of claim 16, wherein the cache controller is further to:
detect a first bit of a transaction identifier vector being set and detect a transaction identifier field of a cache line status vector for each of the first cache lines being set with the first transaction identifier to receive the indication of execution of the first transaction; and
detect a second bit of the transaction identifier vector being set and detect the transaction identifier field of the cache line status vector for each of the second cache lines being set with the second transaction identifier to receive the indication of execution of the second transaction.

18. The cache memory system of claim 16, wherein the cache controller is further to:
indicate the abortion of the first transaction by way of at least one of issuing a first interrupt, issuing a first trap, and setting a first predication bit; and
indicate the abortion of the second transaction by way of at least one of issuing a second interrupt, issuing a second trap, and setting a second predication bit.

19. The cache memory system of claim 16, wherein the cache controller is further to:
upon initiation of the second transaction, ensure each of the second cache lines is in one of the shared state and the invalid state; and
during the second transaction, in response to a second external request for any of the second cache lines in the modified state, the owned state, or the exclusive state:
invalidate each of the second cache lines in the modified state or the owned state without writing the cache line to the main memory;
demote each of the second cache lines in the exclusive state to one of the shared state and the invalid state; and
abort the second transaction.

20. The cache memory system of claim 19, wherein the second external request comprises one of a snoop request originating outside the second transaction and a capacity fault.

21. Apparatus, comprising:
a cache memory including cache lines, wherein each of the cache lines is in one of a modified state, an owned state, an exclusive state, a shared state, and an invalid state; and a cache controller coupled to the cache memory and operable to perform operations including, enforcing a cache coherency protocol upon the cache memory, upon initiation of a read-modify-write transaction accessing at least one of the cache lines, ensuring each of the cache lines is in one of the shared state and the invalid state, the ensuring including writing back to main memory each cache line in the modified state and each cache line in the owned state, and during the read-modify-write transaction, in response to an external request originated outside the transaction any of the cache lines in the modified state, the owned state, or the exclusive state:

invalidating each of the cache lines in the modified state and each cache line in the owned state without writing the cache line to a main memory;

demoting each of the cache lines in the exclusive state to one of the shared state and the invalid state;

aborting the read-modify-write transaction; and reattempting the first transaction after the aborting.

* * * * *